United States Patent
Park et al.

(10) Patent No.: US 11,506,140 B1
(45) Date of Patent: Nov. 22, 2022

(54) CONTROL APPARATUS AND METHOD OF ENGINE FOR HYBRID VEHICLE

(71) Applicants: HYUNDAI MOTOR COMPANY, Seoul (KR); KIA CORPORATION, Seoul (KR)

(72) Inventors: Jong Il Park, Seoul (KR); Hyunjin Kang, Hwaseong-si (KR); Seungwoo Hong, Seoul (KR); Kwanhee Lee, Suwon-si (KR); Jaeheun Kim, Pyeongtaek-si (KR); Dong Hee Han, Seongnam-si (KR); Jonghyeok Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/496,084

(22) Filed: Oct. 7, 2021

(30) Foreign Application Priority Data

Jun. 10, 2021 (KR) .......................... 10-2021-0075661

(51) Int. Cl.
*F02D 41/40* (2006.01)
*F02D 41/14* (2006.01)

(52) U.S. Cl.
CPC ....... *F02D 41/402* (2013.01); *F02D 41/1454* (2013.01); *F02D 41/1475* (2013.01)

(58) Field of Classification Search
CPC . F02D 41/402; F02D 41/1454; F02D 41/1475
See application file for complete search history.

(56) References Cited

U.S. PATENT DOCUMENTS

| | | | | |
|---|---|---|---|---|
| 11,313,310 B1* | 4/2022 | Kiwan | ............... | F02D 41/2467 |
| 2006/0086083 A1* | 4/2006 | Yacoub | ............... | F02D 41/1477 |
| | | | | 60/301 |
| 2006/0094566 A1* | 5/2006 | Keeler | ................ | F02M 61/188 |
| | | | | 123/549 |
| 2010/0057329 A1* | 3/2010 | Livshiz | ................ | F02D 41/402 |
| | | | | 701/103 |

FOREIGN PATENT DOCUMENTS

| | | |
|---|---|---|
| CN | 107813691 A | 3/2018 |
| KR | 2020-0095296 A | 8/2020 |
| KR | 2020-0096014 A | 8/2020 |

(Continued)

*Primary Examiner* — Joseph J Dallo
(74) *Attorney, Agent, or Firm* — McDonnell Boehnen Hulbert & Berghoff LLP (57) ABSTRACT

A control apparatus of an engine for a hybrid vehicle includes an engine including at least one cylinder that generates power required for vehicle driving by fuel combustion, an injector that injects fuel into the cylinder, a driving motor that assists the power of the engine, and a controller that selectively performs a single injection mode in which fuel is injected once into the cylinder of the engine through the injector and a multiple injection mode in which fuel is injected a plurality of times into the cylinder of the engine through the injector, in a transition region that transitions from a theoretical air-fuel ratio operating region in which the engine is operated at a theoretical air-fuel ratio to a lean-burn combustion operating region in which the engine is operated leaner than the theoretical air-fuel ratio.

8 Claims, 8 Drawing Sheets

(56) References Cited

FOREIGN PATENT DOCUMENTS

| WO | WO-0140644 A1 | * | 6/2001 | ............... F02C 9/28 |
| WO | WO-02075136 A1 | * | 9/2002 | ............ F02D 37/02 |
| WO | WO-2004101972 A1 | * | 11/2004 | ............... F02B 43/10 |
| WO | WO-2007039368 A1 | * | 4/2007 | ............ F02D 37/02 |
| WO | WO-2009114444 A2 | * | 9/2009 | ............... F02B 1/08 |

* cited by examiner

CONTROL APPARATUS AND METHOD OF ENGINE FOR HYBRID VEHICLE

CROSS REFERENCE TO RELATED APPLICATIONS

This application claims priority to and the benefit of Korean Patent Application No. 10-2021-0075661 filed in the Korean Intellectual Property Office on Jun. 10, 2021, the entire contents of which are incorporated herein by reference.

BACKGROUND

(a) Field

The present disclosure relates to a control apparatus and method of an engine for a hybrid vehicle, and more particularly, to a control apparatus and method of an engine for a hybrid vehicle for a fuel injection strategy in a transition period between a theoretical air-fuel ratio operating region and a lean-burn combustion operating region.

(b) Description of the Related Art

A hybrid vehicle is a vehicle using two or more power sources, and generally refers to a hybrid electric vehicle driven using an engine and a driving motor. The hybrid electric vehicle may have various structures using two or more power sources including an engine and a driving motor.

The engine applied to the hybrid vehicle appropriately mixes air introduced from the outside and fuel at a predetermined ratio, and generates driving power by burning the mixed gas, while the driving motor assists the power of the engine as necessary.

Since the driving motor of the hybrid vehicle assists the power of the engine thereof, the engine applied to the hybrid vehicle is mainly operated around an optimal operating point (OOP) for enhancement of fuel efficiency.

In this case, the engine may be operated at a theoretical air-fuel ratio in a low-middle speed and medium-high load region, and lean-burn combustion may be performed in the low-speed and low-load region.

When the engine is operated at the theoretical air-fuel ratio ($\lambda=1$), complete combustion may be realized inside a cylinder, and purification efficiency of a catalyst that purifies exhaust gas is improved.

When lean-burn combustion (for example, $\lambda>1$) operation in which an air-fuel ratio is greater than the theoretical air-fuel ratio is performed in the low-speed and low-load region, fuel efficiency and nitrogen oxide (NOx) emission are improved.

However, when the engine performs the theoretical air-fuel ratio operation or lean-burn combustion operation according to an operating region, combustion stability may not be secured in a transition section between the theoretical air-fuel ratio operation and the lean-burn combustion operation.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide an apparatus and method of an engine for a hybrid vehicle that may ensure combustion stability in a transition region between a theoretical air-fuel ratio operation and a lean-burn combustion operation of an engine applied to a hybrid vehicle.

An embodiment of the present disclosure provides a control apparatus of an engine for a hybrid vehicle, including an engine including at least one cylinder that generates power required for vehicle driving by fuel combustion, an injector that injects fuel into the cylinder, a driving motor that assists the power of the engine, and a controller that selectively performs a single injection mode in which fuel is injected once into the cylinder of the engine through the injector and a multiple injection mode in which fuel is injected a plurality of times into the cylinder of the engine through the injector, in a transition region that transitions from a theoretical air-fuel ratio operating region in which the engine is operated at a theoretical air-fuel ratio to a lean-burn combustion operating region in which the engine is operated leaner than the theoretical air-fuel ratio.

The controller may perform the multiple injection mode in an overshoot section in which an air-fuel ratio exceeds a target air-fuel ratio in the transition region.

The controller may perform the single injection mode in a section except for an overshoot section in which an air-fuel ratio exceeds a target air-fuel ratio in the transition region.

The multiple injection mode may be a triple injection mode that injects fuel into the cylinder three times.

The multiple injection mode may be a triple injection mode in which fuel is injected twice during an intake stroke and fuel is injected once during a compression stroke.

An amount of fuel injected during the intake stroke may be larger than an amount of fuel injected during the compression stroke.

Another embodiment of the present disclosure provides a control method of an engine for a hybrid vehicle, including determining, by a controller, whether an operating region of an engine transitions from a theoretical air-fuel ratio operating region to a lean-burn combustion operating region, determining, by the controller, whether an overshoot in which a theoretical air-fuel ratio exceeds a target air-fuel ratio occurs during transitioning to the lean-burn combustion operating region, and determining an injection mode of fuel as a multiple injection mode when the overshoot occurs.

The multiple injection mode may be a triple injection mode that injects fuel into a cylinder of the engine three times.

In the triple injection mode, fuel may be injected twice during an intake stroke, and fuel is injected once during a compression stroke.

An amount of fuel injected during the intake stroke may be larger than an amount of fuel injected during the compression stroke.

According to the control apparatus and method of the engine for the hybrid vehicle according to the embodiment of the present disclosure as described above, when an air-fuel ratio overshoot occurs due to a sudden increase in an amount of air while an engine transitions from a theoretical air-fuel ratio operating mode to a lean-burn operating mode, it is possible to ensure combustion stability by injecting fuel multiple times through a multiple injection mode.

BRIEF DESCRIPTION OF THE FIGURES

These drawings are for reference only in describing embodiments of the present disclosure, and therefore, the technical idea of the present disclosure should not be limited to the accompanying drawings.

DETAILED DESCRIPTION

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

In order to clearly describe the present disclosure, parts that are irrelevant to the description are omitted, and identical or similar constituent elements throughout the specification are denoted by the same reference numerals.

In addition, since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

Hereinafter, a control apparatus of an engine for a hybrid vehicle according to an embodiment of the present disclosure will be described in detail with reference to the accompanying drawings.

Figure 1:
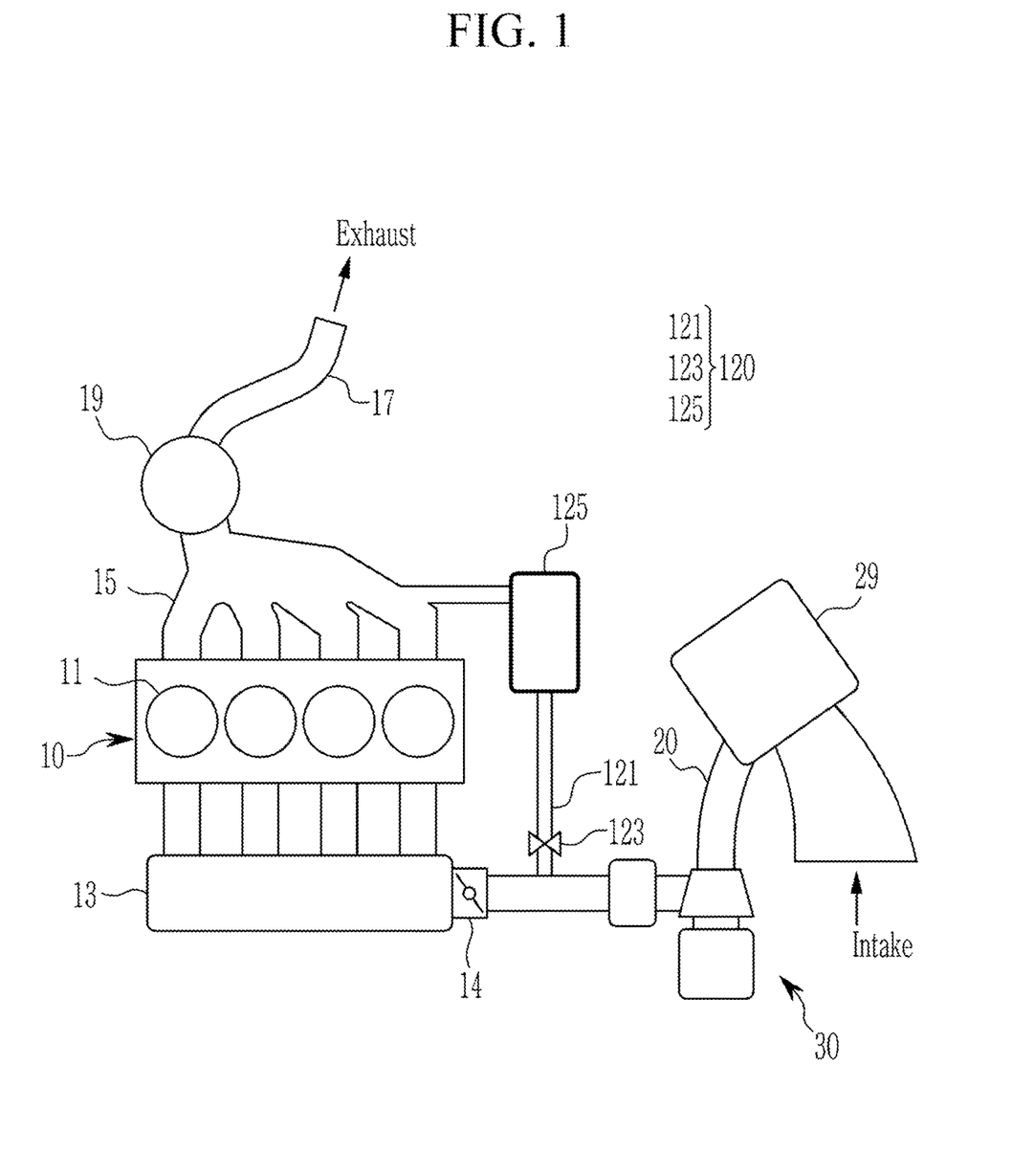
FIG. 1 illustrates a schematic view of an engine for a hybrid vehicle according to an embodiment of the present disclosure.
Figure 2:
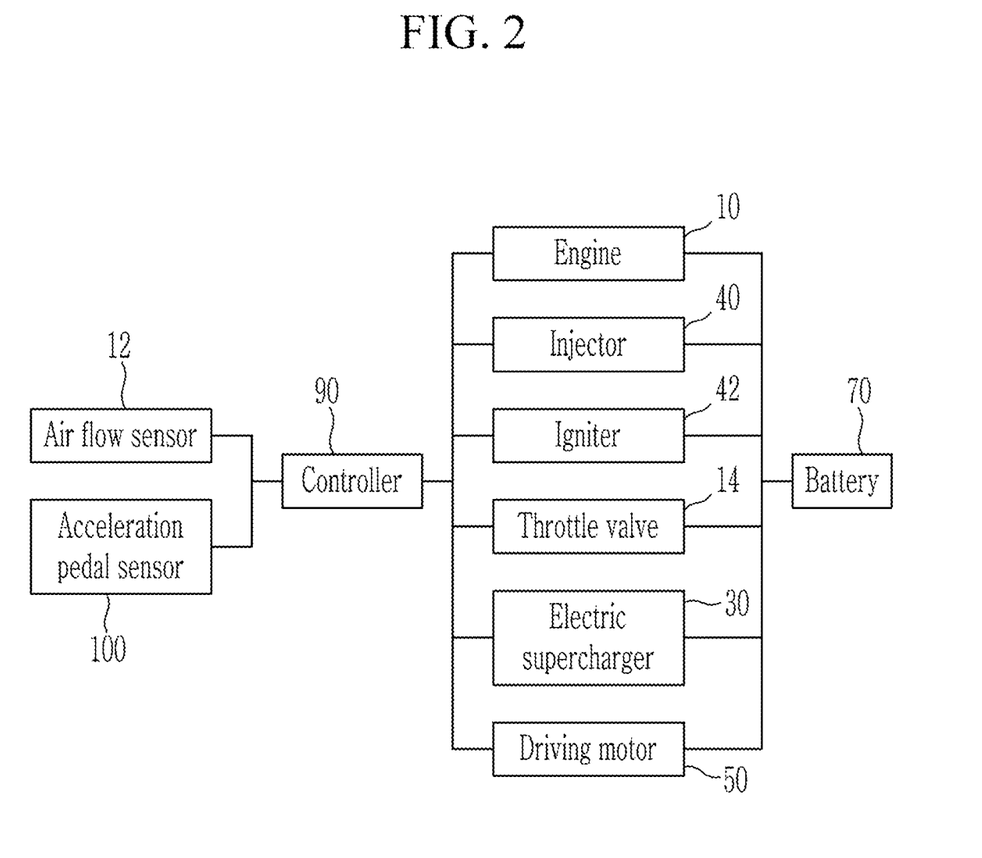
FIG. 2 illustrates a block diagram of a control apparatus of an engine for a hybrid vehicle according to an embodiment of the present disclosure.

FIG. 1 illustrates a schematic view of an engine for a hybrid vehicle according to an embodiment of the present disclosure. FIG. 2 illustrates a block diagram of a control apparatus of an engine for a hybrid vehicle according to an embodiment of the present disclosure.

As shown in FIG. 1 and FIG. 2, a control apparatus of an engine 10 for a hybrid vehicle according to an embodiment of the present disclosure may include the engine 10, a driving motor 50, a battery 70, an electric supercharger 30, an injector 40, an igniter 42, and a controller 90.

First, a structure of a system of the engine 10 for the hybrid vehicle according to the embodiment of the present disclosure will be described in detail with reference to the accompanying drawings.

The system of the engine 10 according to the embodiment of the present disclosure includes the engine 10 including at least one cylinder 11 that generates power required for driving a vehicle by combustion of fuel, an intake line 20 through which outside air supplied to the cylinder 11 flows, and the electric supercharger 30 installed on the intake line 20.

An amount of air supplied to the cylinder 11 is sensed through an air flow sensor 12, and the sensed amount of the air is transmitted to the controller 90.

Exhaust gas generated from the cylinder 11 of the engine 10 is exhausted to the outside through an exhaust manifold 15 and an exhaust line 17. A catalytic converter 19 including a catalyst to purify the exhaust gas is installed in the exhaust line 17. The catalytic converter 19 may include a lean NOx trap (LNT), a diesel oxidation catalyst, and a diesel particulate filter, for purifying a nitrogen oxide. Alternatively, the catalytic converters 19 may include a three-way catalyst for purifying a nitrogen oxide.

The injector 40 for injecting fuel is installed in the cylinder 11 of the engine 10. The injector 40 may be a gasoline direct injector (GDI) that directly injects fuel into the cylinder 11, or a port injector 40 that injects fuel into an intake port connected to a plurality of cylinders 11.

The igniter 42 (spark plug) that ignites the fuel injected through the injector 40 is mounted on the cylinder 11 of the engine 10.

The electric supercharger 30 installed in the intake line 20 is to supply supercharged air to the cylinder 11, and includes a motor and an electric compressor. The electric compressor is operated by a motor to compress the outside air according to an operational condition and supply it to the cylinder 11.

An air cleaner 29 for filtering the outside air introduced from the outside is mounted at an inlet of the intake line 20.

Intake air introduced through the intake line 20 is supplied to the cylinder 11 through an intake manifold 13. A throttle valve 14 is mounted on the intake manifold 13 to control an amount of air supplied to the cylinder 11.

The driving motor 50 is operated by using electrical energy charged in the battery 70, and operates as a generator to generate electrical energy as necessary. The electrical energy generated by the driving motor 50 is charged in the battery 70.

The system of the engine 10 according to the embodiment of the present disclosure includes an exhaust gas recirculation apparatus. The exhaust gas recirculation apparatus (EGR) 120 is an apparatus that re-supplies some of exhaust gas exhausted from the cylinder 11 of the engine 10 to the cylinder 11 of the engine 10, and may include an EGR line 121 branching from the exhaust line 17 and joining the intake line 20, an EGR valve 123 installed in the EGR line to control an amount of recirculated exhaust gas, and an EGR cooler 125 installed in the EGR line to cool the recirculated exhaust gas.

The controller 90 controls constituent elements of the vehicle including the engine 10, the driving motor 50, the electric supercharger 30, the battery 70, the injector 40, the igniter 42, and the throttle valve 14.

To this end, the controller 90 may be provided as at least one processor executed by a predetermined program, and the predetermined program is configured to perform respective steps of a control method of the engine 10 for the hybrid vehicle according to an embodiment of the present disclosure.

The controller of the engine 10 for the hybrid vehicle according to the embodiment of the present disclosure selectively performs single injection and multiple injection through the injector 40 according to an operating region of the engine 10. The single injection means one injection of fuel during an intake stroke. The multiple injection means multiple injections of fuel during the intake stroke.

Figure 3:
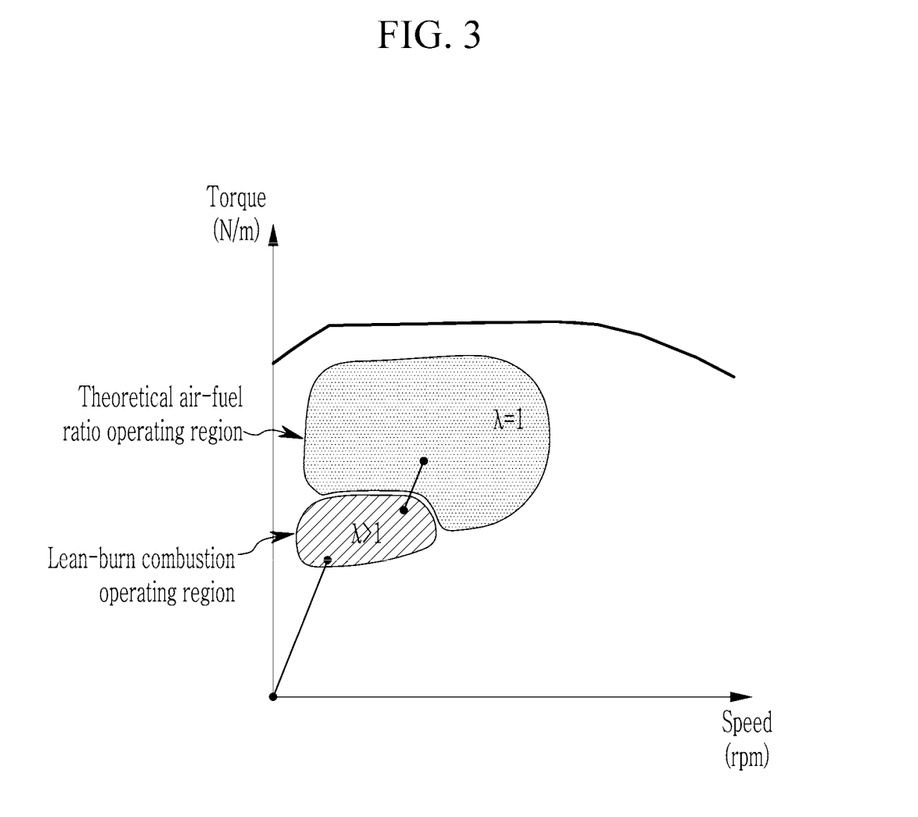
FIG. 3 illustrates a graph of an operating region of an engine according to an embodiment of the present disclosure.

Referring to FIG. 3, in the embodiment of the present disclosure, the engine 10 operates around an optimal operating point (OOP). The engine 10 operates at the theoretical air-fuel ratio in a medium-high-speed and medium-high-load region, and in a low-speed and low-load region, lean-burn combustion is performed in which an air-fuel ratio is greater than the theoretical air-fuel ratio.

Hereinafter, a region in which the engine 10 is operated at the theoretical air-fuel ratio is referred to as a theoretical air-fuel ratio operating region, and a region in which the engine 10 is operated at lean-burn combustion is referred to as a lean-burn combustion operating region. In addition, a region moving from the theoretical air-fuel ratio operating region to the lean-burn combustion operating region is referred to as a transition region.

The operating region of the engine 10 may be determined according to a driver's will to accelerate. The driver's will to accelerate may be determined from an amount of pressing of an acceleration pedal sensor (APS) 100.

In the theoretical air-fuel ratio operating region, the controller 90 controls fuel injection into the cylinder 11 through the single injection. In the lean-burn combustion operating region, the controller 90 controls fuel injection into the cylinder 11 through the single injection. In the transition region, the controller 90 selectively performs the single injection or the multiple injection.

When an operating region of the engine 10 transitions from the theoretical air-fuel ratio operating region to the lean-burn combustion operating region, an amount of air supplied to the cylinder 11 must be momentarily increased. When the amount of air supplied to the cylinder 11 is momentarily increased for the lean-burn combustion operation, in order to follow a target air-fuel ratio that is larger than the theoretical air fuel ratio, overshoot occurs in which the air-fuel ratio momentarily exceeds the target air-fuel ratio.

When the overshoot of the air-fuel ratio occurs in the transition region (when the air-fuel ratio exceeds the target air-fuel ratio), and when the single injection is performed, combustion stability is deteriorated. Therefore, in the overshoot section of the transition region, the controller 90 performs the multiple injection through the injector 40.

As described above, when the multiple injection is performed in the overshoot section of the transition region, fuel and air are smoothly mixed, and a temperature of intake air is lowered by latent heat when fuel is evaporated, thereby improving combustion stability.

Hereinafter, a control method of an engine for a hybrid vehicle according to an embodiment of the present disclosure will be described in detail with reference to the accompanying drawings.

Figure 4:
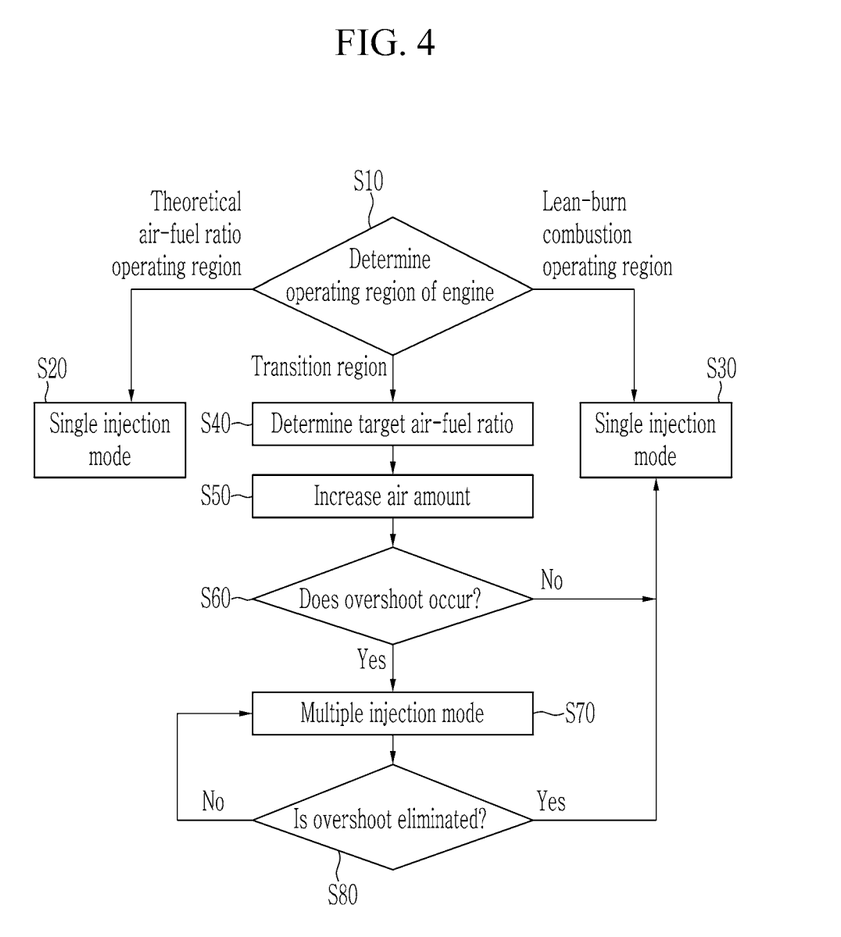
FIG. 4 illustrates a flowchart of a control method of an engine for a hybrid vehicle according to an embodiment of the present disclosure.

FIG. 4 illustrates a flowchart of a control method of an engine for a hybrid vehicle according to an embodiment of the present disclosure.

The controller 90 determines an operating region of the engine 10 based on a driver's required torque at S10.

When the operating region of the engine 10 is the theoretical operating region, the controller 90 determines a fuel injection mode as a single injection mode, and injects the fuel once during the intake stroke through the injector 40 at S20. The single injection mode is a mode in which all fuel required during a cycle of the engine 10 is injected once during the intake stroke.

When the operating region of the engine 10 is the transition region transitioning from the theoretical air-fuel ratio operating region to the lean-burn combustion operating region at S10, the controller 90 determines the target air-fuel ratio corresponding to the driver's required torque at S40.

To implement the lean-burn combustion mode, the controller 90 increases the amount of air supplied to the cylinder 11 through the electric supercharger 30 or increases an opening degree of the throttle valve 14 so that the air-fuel ratio reaches the target air-fuel ratio at S50.

The air flow sensor 12 measures the amount of air supplied to the cylinder 11 to transmit it to the controller 90.

The controller 90 calculates the air-fuel ratio based on the amount of air detected by the air flow sensor 12, and detects whether the overshoot in which the air-fuel ratio exceeds the target air-fuel ratio occurs at S60.

When the overshoot occurs in which the air-fuel ratio exceeds the target air-fuel ratio at S60, the controller 90 determines the fuel injection mode as a multiple injection mode, and injects the fuel a plurality of times through the injector 40 at S70.

In step S60, when the overshoot does not occur, the controller 90 determines the fuel injection mode as a single injection mode, and injects the fuel once through the injector 40 at S30.

In the embodiment of the present disclosure, the multiple injection mode may be a triple injection mode in which the fuel is injected three times.

In the multiple injection mode, the fuel may be injected three times during the intake stroke and the compression stroke through the injector 40.

Figure 5:
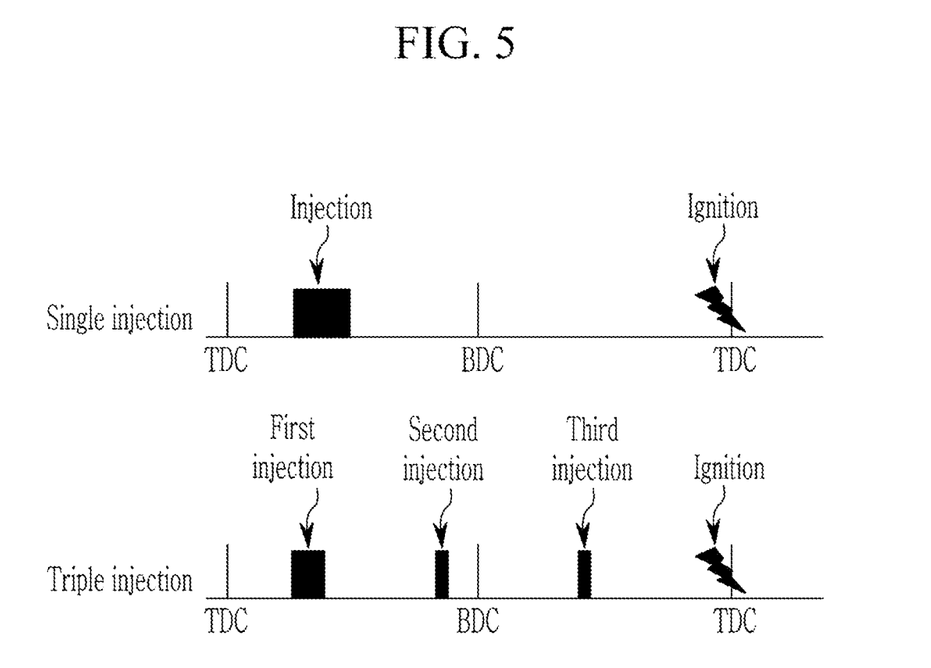
FIG. 5 is a view for explaining single injection and multiple injection according to an embodiment of the present disclosure.

Referring to FIG. 5, first fuel may be injected at a first crank angle (for example, 40 degrees) after top dead center (TDC), second fuel may be injected at a second crank angle (for example, 165 degrees) after TDC, and third fuel may be injected at a third crank angle (for example, 265 degrees) after TDC. That is, the first fuel and the second fuel may be injected during the intake stroke, and the third fuel may be injected during the compression stroke.

In this case, the first injected fuel amount may be 60% of the total fuel amount, and the second and third injected fuel amounts may be 20% of the total fuel amount. That is, the first injected fuel amount may be the largest. In other words, the amount of fuel injected during the intake stroke may be larger than the amount of fuel injected during the compression stroke.

Figure 6:
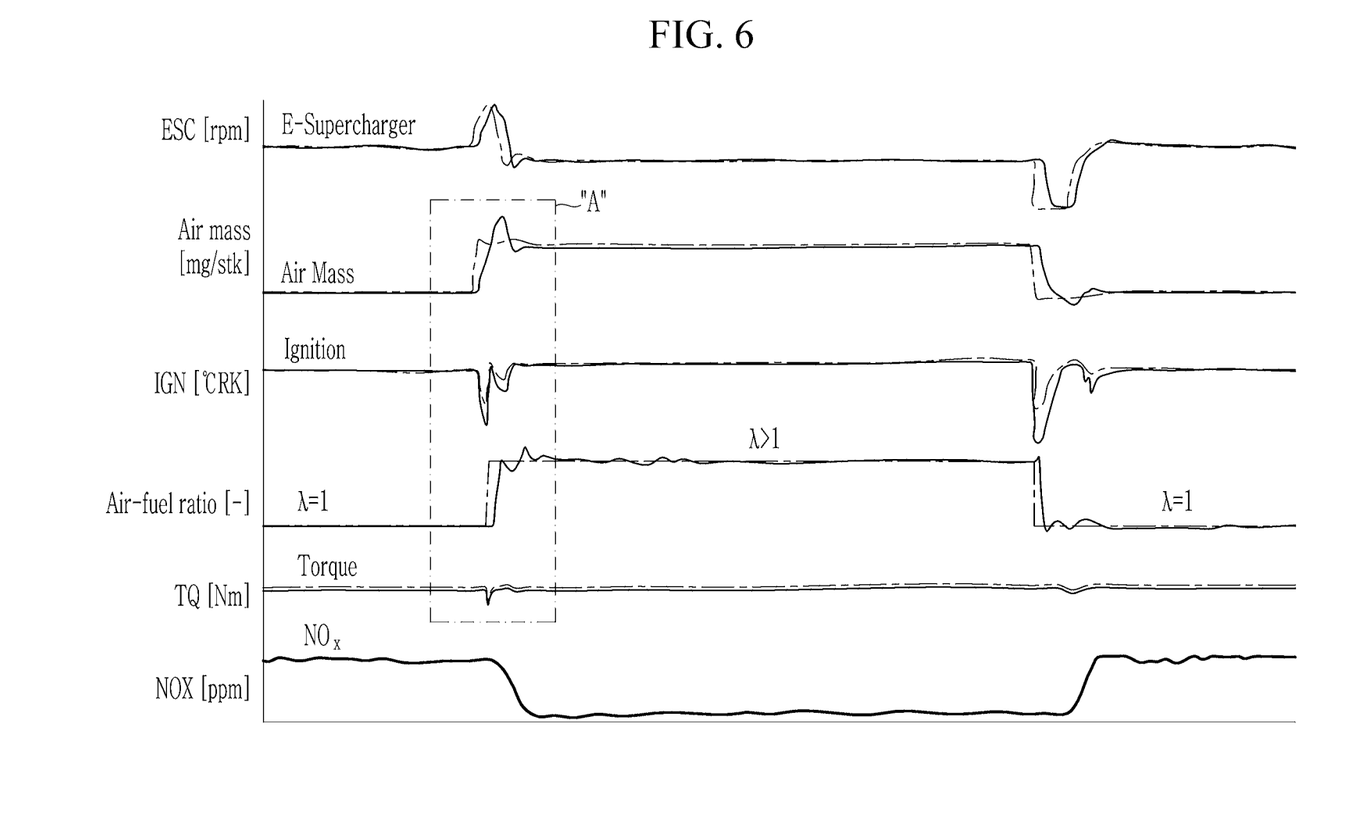
FIG. 6 illustrates a graph of main parameters in a transition region according to an embodiment of the present disclosure.
Figure 7:
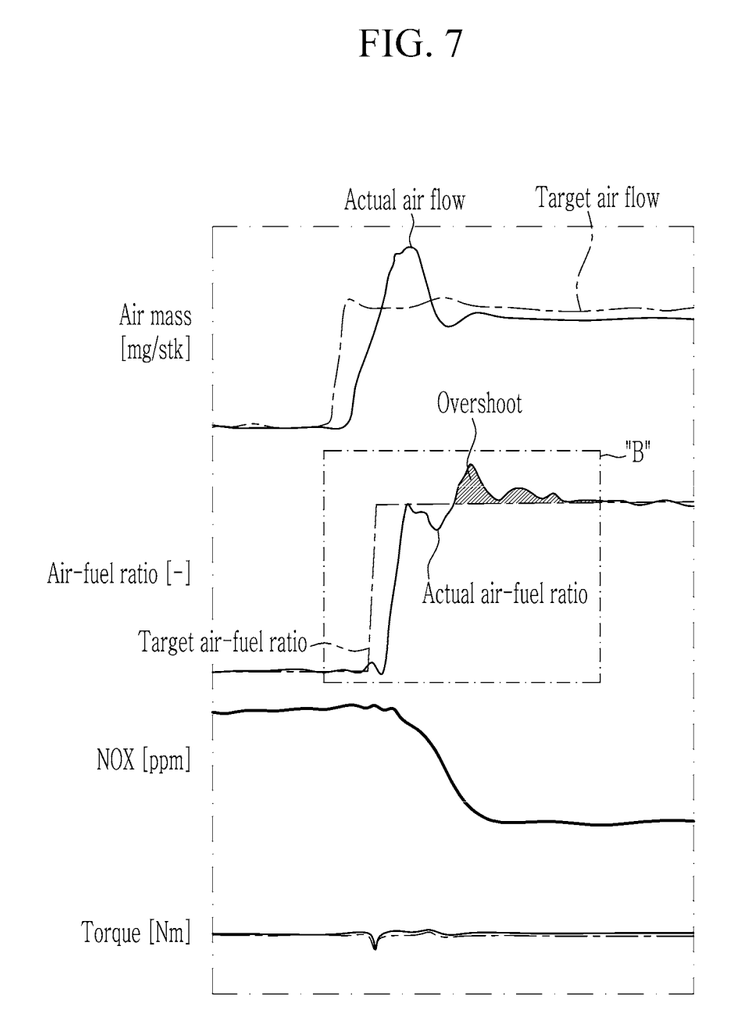
FIG. 7 illustrates an enlarged graph of a portion "A" of FIG. 6.
Figure 8:
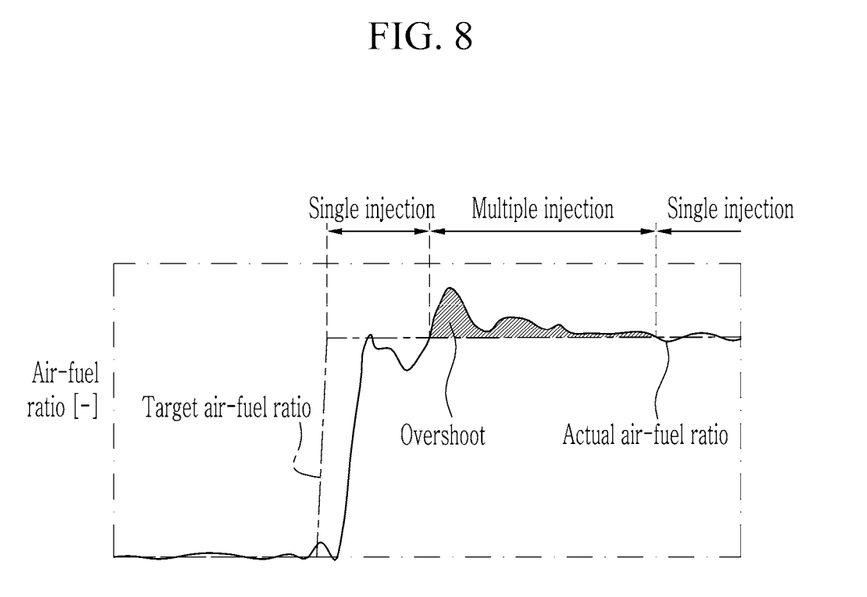
FIG. 8 illustrates an enlarged graph of a portion "B" of FIG. 7.

Referring to FIG. 6 to FIG. 8, when the amount of air rapidly increases in the process of transitioning from the theoretical air-fuel ratio operating region to the lean-burn combustion operating region, the air-fuel ratio ($\lambda$) does not stably follow the target air-fuel ratio ($\lambda sp$), and thus the overshoot occurs.

When the fuel is injected in the single injection mode when the air-fuel ratio overshoot occurs, combustion stability may not be ensured.

Therefore, when the fuel is injected in the multiple injection mode when the air-fuel ratio overshoot occurs, the fuel and air may be smoothly mixed, and the temperature of intake air may be lowered by latent heat due to fuel evaporation. In addition, the combustion stability may be secured by lowering an internal temperature of the cylinder 11 while low-temperature intake air collides with a piston or an inner wall of the cylinder 11.

When the overshoot is eliminated in the transition region at S80, or when the operating region of the engine 10 completely moves through the transition region to the lean-burn combustion operating region at S10, the controller 90 determines the injection mode of the fuel as a single injection mode, and injects the fuel once during the intake stroke through the igniter 42 at S30.

According to the control apparatus and method of the engine 10 for the hybrid vehicle according to the embodiment of the present disclosure as described above, when the air-fuel ratio overshoot occurs due to a sudden increase in an amount of air while the engine 10 transitions from the theoretical air-fuel ratio operating mode to the lean-burn operating mode, it is possible to ensure combustion stability by injecting the fuel through the multi-injection mode.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

The invention claimed is:

1. A control apparatus of an engine for a hybrid vehicle, comprising:
    an engine including at least one cylinder that generates power required for a vehicle powered by fuel combustion;
    an injector configured to inject fuel into the cylinder;
    a driving motor configured to assist the power of the engine; and
    a controller configured to perform a single injection mode in which fuel is injected once into the cylinder of the engine through the injector, and configured to perform a multiple injection mode in which fuel is injected a plurality of times into the cylinder of the engine through the injector, the controller being configured to operate in a transition region that transitions from a theoretical air-fuel ratio operating region in which the engine is operated at a theoretical air-fuel ratio to a lean-burn combustion operating region in which the engine is operated leaner than the theoretical air-fuel ratio;
    wherein the controller performs the multiple injection mode in an overshoot section in which an air-fuel ratio exceeds a target air-fuel ratio in the transition region; and
    wherein the controller performs the single injection mode in a section other than an overshoot section in which an air-fuel ratio exceeds a target air-fuel ratio in the transition region.

2. The control apparatus of the engine for the hybrid vehicle of claim 1, wherein the multiple injection mode is a triple injection that injects fuel into the cylinder three times.

3. The control apparatus of the engine for the hybrid vehicle of claim 1, wherein the multiple injection mode is a triple injection in which fuel is injected twice during an intake stroke and fuel is injected once during a compression stroke.

4. The control apparatus of the engine for the hybrid vehicle of claim 3, wherein an amount of fuel injected during the intake stroke is larger than an amount of fuel injected during the compression stroke.

5. A control method of an engine for a hybrid vehicle, comprising:
    determining, by a controller, whether an operating region of an engine transitions from a theoretical air-fuel ratio operating region to a lean-burn combustion operating region;
    determining, by the controller, whether an overshoot in which a theoretical air-fuel ratio exceeds a target air-fuel ratio occurs during transitioning to the lean-burn combustion operating region; and
    determining an injection mode of fuel as a multiple injection mode when the overshoot occurs.

6. The control method of the engine for the hybrid vehicle of claim 5, wherein the multiple injection mode is a triple injection mode that injects fuel into a cylinder of the engine three times.

7. The control method of the engine for the hybrid vehicle of claim 6, wherein in the triple injection mode, fuel is injected twice during an intake stroke, and fuel is injected once during a compression stroke.

8. The control method of the engine for the hybrid vehicle of claim 6, wherein an amount of fuel injected during the intake stroke is larger than an amount of fuel injected during the compression stroke.

* * * * *